April 3, 1934.     R. LAPSLEY     1,953,113
TRANSMISSION
Filed Oct. 13, 1930     2 Sheets-Sheet 2
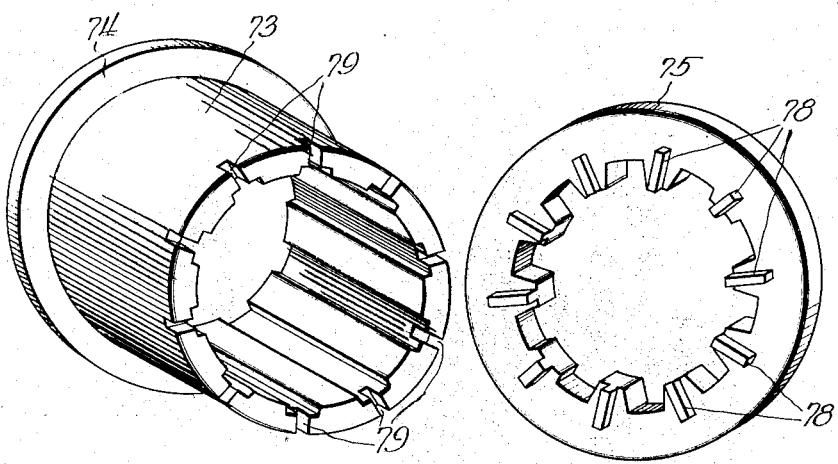
Fig. 3.     Fig. 4.
Fig. 2.
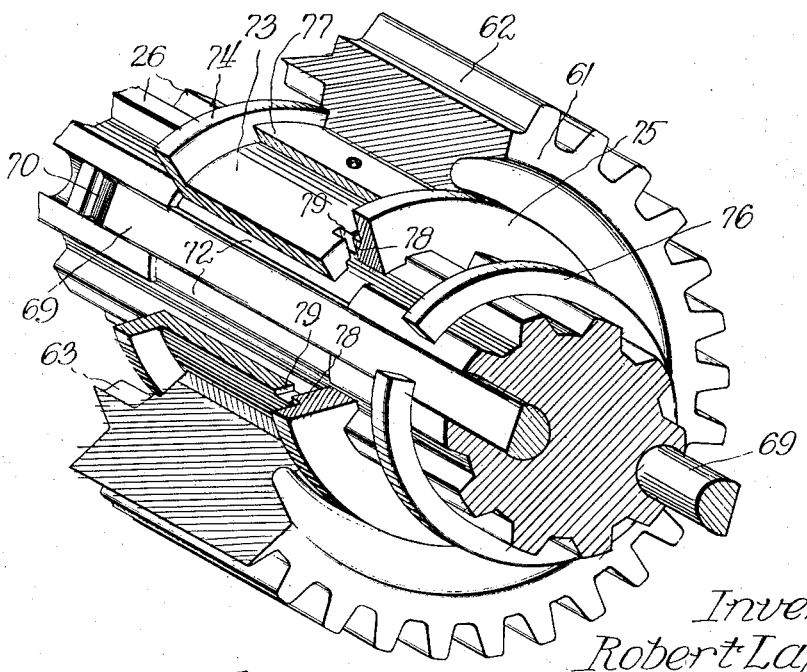
Inventor:
Robert Lapsley
By Brown, Jackson, Boettcher & Dienner
Attys.

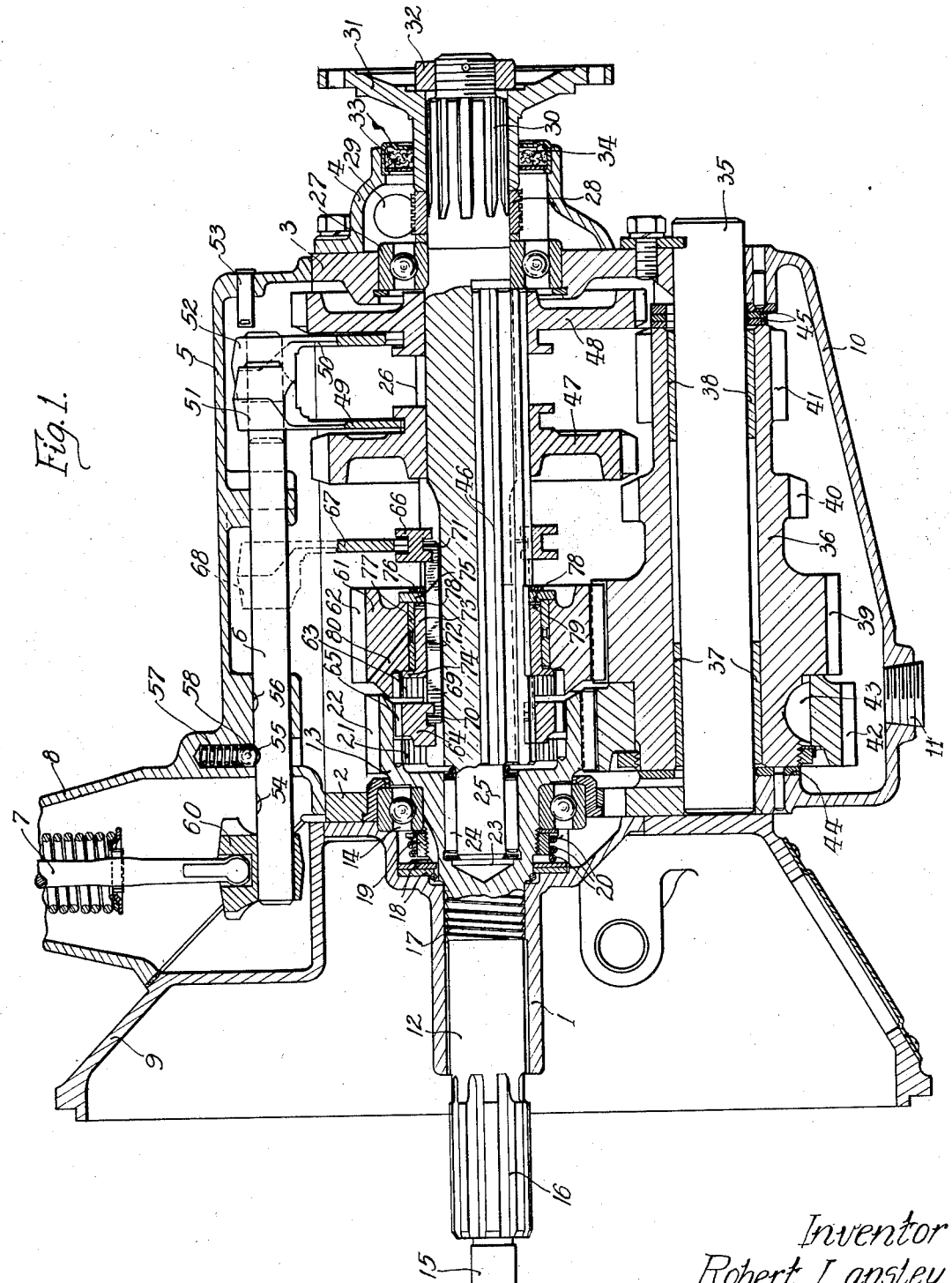

Patented Apr. 3, 1934

1,953,113

UNITED STATES PATENT OFFICE 1,953,113

TRANSMISSION

Robert Lapsley, Berrien Springs, Mich., assignor to Clark Equipment Company, Buchanan, Mich., a corporation of Michigan Application October 13, 1930, Serial No. 488,247

11 Claims. (Cl. 308—135)

This invention relates, generally speaking, to transmissions, and is particularly concerned with improvements in transmissions for automobiles, having internal and external gear reductions suitable for effecting quiet gear shift and efficient continuous drive.

The difficulties in designing an efficient transmission reside in the various component and cooperating parts, such as the gear casing and its bearing supports or brackets which are difficult and expensive in production and assembly, and in the various gears and their proper location, supports and actuation. These points have to be considered carefully from the production, operation and maintenance point of view if it is desired to produce an efficient transmission in which undesirable noise and wear are reduced to a minimum while keeping the production costs at a reasonable level.

I have invented a novel and improved transmission of this character which answers the requirements of production, operation and maintenance as briefly intimated above. I shall presently disclose the invention in detail. However, in order to furnish a basis for a clear understanding of my invention, I desire to mention, in a general manner, the salient structural improvements which I have incorporated in my novel transmission disclosed in this specification.

The driving shaft of my improved transmission is carried upon two suitable bearings, and provided at one end with an external driving gear and an internal clutch gear located inside the driving gear. The driven shaft is rotatable at one end within a spigot bearing located within the body of the driving shaft and supported by a suitable second bearing attached to the transmission casing. An intermediate driven gear, provided with an internal clutch gear, is rotatably attached to the driven shaft in such a manner as to prevent its endwise movement thereon. A clutch collar is splined to the driven shaft, rotatable therewith and endwise shiftable thereon. This clutch collar is positioned between the driving gear and the intermediate driven gear. It is provided with external teeth and adapted, when properly shifted on the driven shaft, to engage the internal clutch teeth of either the driving gear or of the intermediate driven gear. When this clutch collar is moved into engagement with the internal clutch teeth of the driving gear, it will effect a direct drive from the driving to the driven shaft. However, when the same is moved on the driven shaft in the other direction, into engagement with the internal clutch teeth of the intermediate driven gear, it will effect a gear reduction from the driving gear to a secondary driven gear which is in engagement with the intermediate driven gear, in a manner to be described later on in detail.

The driving and the driven gears mentioned so far, may be standard spur gears, herringbone gears, or helical gears of any desirable type, ratio or width.

Another salient feature of the invention resides in the method of rotatably mounting the intermediate driven gear on the driven shaft and in securing the same against endwise movement thereon.

I have, for this purpose, provided a groove around the diameter of the driven shaft. A retainer sleeve provided with a spline hole which is proportioned so as to allow it to be slid over the large portion of the spline on the driven shaft is positioned on the driven shaft until it registers with the groove. The retainer sleeve is then rotated until the inside diameter of its spline hole fits upon the outside diameter of the splines of the driven shaft within the groove.

Integral with the retainer sleeve is a laterally extending retainer collar which serves the purpose of positioning the intermediate driven gear against endwise movement in one direction. At the other end of the retainer sleeve, opposite the laterally extending collar, are provided key slots, adapted to be engaged by suitable keys on a retainer washer which has a spline hole to fit the splines on the driven shaft. The washer can be slipped on the driven shaft but is restrained from rotation thereon.

The groove on the driven shaft is wide enough to permit assembly of the retainer sleeve and the retainer washer with the keys on the washer clearing the end of the sleeve before being positioned within the slots of the sleeve.

The retainer sleeve is rotated to its proper position relative to the splines on the driven shaft within the groove. The retainer washer is then moved against the end of the sleeve with the keys entering the slots in the end of the retainer sleeve. Now, since the retainer washer is restrained from rotation on the driven shaft due to having a spline hole which fits the splines on the shaft, and since the keys thereon engage slots in the end of the retainer sleeve, it will be evident that the retainer sleeve is now also restrained from rotation upon the driven shaft. In other words, the retainer sleeve and the retainer washer are keyed to each other and rotate with the driven shaft. A snap ring is slipped into the groove on the shaft to fill up the groove and to prevent separation of the retainer sleeve and retainer washer.

The intermediate driven gear is rotatably mounted on the retainer sleeve between the lateral retainer collar thereon and the retainer washer keyed to it at its other end. The laterally extending collar on the end of the retainer sleeve, which is opposite the retainer washer, provides a ledge or flange which secures the intermediate driven gear against endwise movement in one direction, and the retainer washer extending laterally from the other end of the retainer sleeve secures the gear against endwise movement in the other direction. A bushing is provided on the retainer sleeve which serves as a bearing for the intermediate driven gear.

One object of this invention relates to a transmission having a driving shaft and a driven shaft, the driven shaft being positioned in axial extension of the driving shaft, and bearing means in the driving shaft for rotatably mounting one end of the driven shaft.

Another object is concerned with a transmission having a driving shaft and a driven shaft positioned individually rotatable in axial extension relative to each other, a driving gear provided on the driving shaft and rotatable therewith, an intermediate driven gear provided on the driven shaft and rotatable thereon, internal clutch teeth provided in said driving gear and in said intermediate driven gear, a clutch collar disposed shiftably on said driven shaft and provided with external clutch teeth, said clutch collar being positioned between said driving gear and said intermediate driven gear and adapted to engage either the internal clutch teeth of the driving gear or of the intermediate driven gear, a shifting ring attached to the driven shaft at the other side of said intermediate driven gear, link connections between said clutch collar and said shifting ring, and means for shifting said shifting ring endwise on said driven shaft, to shift said clutch collar into engagement with either clutch teeth provided in said gears.

A further object has to do with a transmission having an internal-external driving gear provided on a driving shaft, an internal-external intermediate driven gear provided rotatably on a driven shaft and disposed adjacent said driving gear, the teeth of the internal gears being of the same dimensions and facing each other, and clutch means being disposed on said driven shaft for connecting said driven shaft to either of said internal gears.

Still another object is concerned with a transmission having a driven shaft, an intermediate driven gear disposed rotatably thereon, means for securing said gear against endwise movement on said driven shaft, said means comprising two separate retaining means having extensions which project laterally to said shaft, and cooperating means on said retaining means for assembling the same on said driven shaft.

Another object relates to a transmission having a shaft, a gear mounted rotatably thereon, and a bearing for said gear, said bearing comprising a plurality of cooperating parts mechanically keyed to each other to form a bearing unit rotatable with the said shaft and securing said gear against movement on said shaft longitudinally thereto.

A further object relates to a snap lock mechanism for the control lever of the transmission, to restrain the movement of said lever in one direction, comprising a pivotally mounted snap lever, an extension thereon for engagement with said control lever, and spring operated plunger means for holding said snap lever in a certain position, the leverage of said snap lever being such as to resist and to oppose the force of said control lever by several times the load of said spring operated plunger means when the control lever is initially shifted into contact with said snap lever, while the leverage of the snap lever multiplies upon further movement of the control lever, quickly reducing the pressure required to displace the control lever into the desired position.

I wish to mention that I do not intend the general discussion of the invention, rendered previously, and the statements of objects furnished above, to limit the invention in any way. I have furnished the general description merely for providing the indispensable background necessary for understanding the various features and objects of the invention and not to show its limitations. Likewise I have furnished the statements of objects to summarize and to enumerate the features of outstanding importance. There are other features and objects which will be apparent as the description progresses.

I shall now describe the invention in detail with reference to the accompanying drawings, in which:

Figure 1 represents a cross-section through a transmission incorporating the various structural and functional improvements; and Figures 2, 3 and 4 are detail views illustrating the mounting for the intermediate gear.

Referring now to Figure 1, reference numeral 1 designates part of the front casing of the transmission housing having the walls 2 and 3. Attached to the rear wall 3 is the shell 4. The top casing 5 encloses the shifter rods, such as the rod 6, which are selectively operable by means of the control lever 7 enclosed within the extension 8 of the top casing 5. The usual flaring casing 9 is attached to the transmission housing and to the top casing as shown. The casing 10, provided with a drain plug 11, is attached to the bottom of the transmission housing. It will be understood, of course, that the assembly of the various casing parts is made oil-tight, by means of suitable gaskets and the like.

The driving shaft 12, having the driving gear 13 is rotatably supported by a bearing 14 provided in the front end of the transmission housing and by a similar bearing which supports its end designated by the numeral 15. The spline 16 may be provided for the attachment of a clutch plate or the like. At 17 are indicated oil grooves; numeral 18 designates retaining washers or gaskets; and 19 indicates a collar for supporting the bearing 14 in its position. A spring 20, disposed between the shoulder of the collar 19 and the washers 18, holds the latter in place.

The driving gear 13 is provided with internal clutch teeth 21 and with external gear teeth 22. A boring 23 is provided in the body of the driving gear for supporting the spigot bearing 24 which serves to support, rotatably, one end 25 of the driven shaft 26, shown partly in section. This driven shaft 26 is supported near its other end by a bearing 27 mounted in the rear end of the housing. A worm gear 28 on the shaft 26 operates a member 29 which may be connected to the speedometer. The splines 30 on the rear end of the driven shaft hold the coupling member 31 which is attached thereto by means of the member 32 as shown. Numeral 33 indicates shell members for holding the packing 34 which may be of felt or the like.

A lay shaft 35 is mounted in the lower portion of the transmission housing as shown, and rotatably mounted on this shaft is the gear casting 36. Reference numerals 37 and 38 designate bearing bushings for the gear casting 36. This gear casting is provided with reduction and idler gears such as 39, 40 and 41. Positively keyed to the gear casting is the gear 42, the key being indicated at 43. Numerals 44 and 45 indicate head bearing washers and retaining washers for the gear casting. Suitable oil grooves and ducts are provided for lubricating the bushings 37 and 38.

The driven shaft 26 is provided with splines such as 46. Gears 47 and 48, each provided with a spline hole which fits the splines on the driven shaft, are shiftable endwise thereon by means of shifting forks such as 49 and 50, which are fastened to the corresponding shifter rods by means of the upper portions 51 and 52 of the shifting forks. The plunger 53 is provided for actuating a suitable electric contact when the reverse shift rod is operated, in order to close a circuit for a corresponding lamp in the rear of the automobile.

Every shift rod, such as the one shown at 6, is provided with suitable indentations such as 54, 55 and 56. A spring such as 57 is adapted to depress a ball such as 58 which, in turn, engages the indentation in the corresponding shift rod, to hold the shift rod in any one of two operating positions and in the neutral position in which the rod 6 is shown, with the ball lock 58 engaging the indentation 55. The actuation of the shifter rods, which, in Figure 1, lie in a plane at right angles to the plane of the drawings, is by means of the control lever 7, the lower end of which engages suitable shift fingers attached to the shift rods. One such shift finger, the one of shift rod 6, is shown at 60.

The present invention is not particularly concerned with low speed drives, reverse drive, and the corresponding provisions for gear shifting. Accordingly, I shall not furnish a more detailed description of the mechanism relating to these points, in addition to the more general description of the structural parts as rendered above. The operation of the low speed drives and reverse drive may be easily found by examining the drawings with relation to the gears 47 and 48 and the gears 40 and 41, as well as the corresponding shifting mechanism comprising the shifter forks 49 and 50 and the shift rods to which these forks are fastened. Other suitable gears and idlers may be substituted for the ones shown.

Some of the novel features and improvements in the present case may be found in connection with the direct drive and intermediate drive, which I shall now explain in detail.

It will be seen that I have provided, on the shaft 26, an intermediate driven gear 61, having external teeth 62 and internal clutch teeth 63. This intermediate driven gear is attached to the shaft 26 in rotatable relation thereto but is prevented from endwise movement thereon. The particular structure and method of attaching this intermediate driven gear 61 to the driven shaft 26 will be described presently. It should be borne in mind for the moment, that this gear is rotatable on the driven shaft 26.

The internal clutch teeth 63 of this intermediate driven gear 62 are similar in size to the internal clutch teeth 21 provided in the driving gear 13, and, as will be seen from the drawings, are located adjacent thereto. The clutch collar 64 provided with external teeth 65 is positioned on the shaft 26, rotatable therewith, and adapted to be shifted forward and backward selectively into engagement with either the internal clutch teeth 21 of the driving gear 13 or with the internal clutch teeth 63 of the intermediate driven gear 61. The manner of shifting the clutch collar 64 will be explained later on.

It will be understood from what has been said above, that direct drive from the driving shaft to the driven shaft may be obtained by shifting the clutch collar 64 to the left so that the gear 65 thereon engages the internal clutch teeth 21 of the driving gear. The transmission will be direct, from the driving shaft, by means of the internal clutch teeth 21 of the driving gear and the teeth 65 on the clutch collar 64 which is splined to the shaft 26. However, if the clutch collar 64 is shifted to the right, a gear reduction will be achieved and the transmission will be from the driving shaft, external teeth 22 on the driving gear 13, gear 42 which is keyed positively to gear 39 and in mesh with the driving gear, and from gear 39 over the intermediate driven gear 62, internal clutch teeth 63, gear 65 of the clutch collar 64 to the driven shaft 26.

The shifting mechanism for the clutch collar 64 is as follows: A shifting ring 66 is splined to the shaft 26, having a splined hole which fits the splines 46. This shifting ring may be shifted on the driven shaft by means of any desired standard shift mechanism. I have shown a shifter fork 67 which may be attached at its upper portion 68 to a suitable shifter rod. This shifter fork engages the shifting ring 66 and, when the corresponding shifter rod to which it is fastened, is actuated, it will move the shifter ring 66 either to the right or left, on the driven shaft 26, depending on the operation of the control lever. Connecting links such as 69 are provided in slots in the driven shaft 26 and engage at their ends slots 70 and 71, respectively, in the clutch collar 64 and in the shifting ring 66, respectively, as shown.

With the structure of the clutch collar shifting mechanism as above described, in mind, it will be understood that the operation of the shifting ring 66 to the front (left in the drawings) will effect engagement of the clutch teeth 65 with the driving gear and provide for direct drive, while its operation to the rear (right in the drawings) will effect a gear reduction over the intermediate driven gear as previously explained.

This clutch engaging and shifting mechanism, as well as the structure and assembly of the gears, as above described represent features of novelty which, it will be recalled, are considered of importance in this invention.

The gears 22, 39, 42 and 62 may be standard spur gears, herringbone gears or helical gears of any desired type, ratio or width.

The particular structure of the mechanism which locates the body 61 of the intermediate driven gear and secures the same against endwise movement on the driven shaft 26, contains further important novel features, and will now be described in detail.

I have provided a groove 72 in the driven shaft 26. Assembled in this groove are the retainer sleeve 73 provided with a laterally extending retaining collar 74; the retainer washer 75 which is mechanically keyed to the retainer sleeve 73; and the snap ring 76 which fills the groove 72 and holds the retainer sleeve 73 in assembly with the retainer washer 75. A bushing 77 is provided between the retaining collar 74 on the retainer sleeve 73 and the retainer washer 75, serving as a bearing for the gear body 61. The lateral collar 74 on the retainer sleeve 73 and the laterally extending retainer washer 75 serve as flanges which prevent endwise movement of the intermediate driven gear.

As to the manner of assembling the various parts in the groove 72 on the driven shaft 26, the retainer sleeve 73 is provided with a spline hole which will permit to slide the same over the large portion of the spline 46 on the driven shaft until it registers with the groove 72. The retainer sleeve is then rotated until the inside diameter of the spline hole fits upon the outside diameter of the splines 46 in the groove 72. There are also slots in the retainer sleeve 73 which clear the connecting links 69 of the clutch collar shifting mechanism.

The retainer washer 75 has a spline hole to fit the splines 46, which adapt the washer to be slipped on the shaft 26 but restrain the same from rotation thereon. Formed integral with the retainer washer 75 are keys such as 78 which engage slots 79 in the end of the retainer sleeve 73. The groove 72 is, of course, wide enough to assemble the sleeve and washer conveniently, with the keys 78 clearing the end of the sleeve.

The retainer sleeve 73 is rotated to its proper position within the groove 72; the retainer washer 75 is moved against the end of the sleeve, with the keys 78 entering the slots 79, restraining the sleeve from rotating on the shaft 26. The snap ring 76 is then slid into the groove 72 to fill the same and to prevent the retainer sleeve and retainer washer from separating.

Oil holes 80 are provided in the body 61 of the intermediate driven gear, drilled at such an angle as to form a scoop. These oil holes lubricate the bushing 77 and the spigot bearing 24 through suitable oil grooves and ducts, by scooping oil thrown off from the driving gear 22.

It will also be understood that changes and modifications might be devised by following the teachings of my disclosure, and it is, therefore, not my intention to limit myself precisely to the structure explained and illustrated, either in details or in its entirety, but to include and make use of all such modifications and changes which fall within the scope and meaning of the following claims. I have defined and expressed in those claims what I consider my invention and new in the art.

I claim:

1. In a transmission of the class described, a rotatable shaft, a splined section thereon, a gear, and means for rotatably mounting said gear upon said splined section, said means comprising a splined member provided with a flange at one end and with key slots at the other end, a splined washer fitting said splined section and provided with key projections for engaging said slots to restrain said flanged member from rotation on said splined section of said shaft, means for holding said member and said washer in engagement and a tubular bearing bushing for said gear disposed on said member between said flange and said washer.

2. In a transmission of the class described, a rotatable shaft, a splined section thereon, a groove in said section, a splined member provided with a flange at one end, said member being rotatable on said shaft within said groove, a washer fitting said splined section, cooperating locking means on said member and on said washer for locking said member radially to said washer to restrain its rotation on said shaft within said groove, means for holding said member and said washer against axial displacement on said shaft within said groove, a tubular bearing bushing on said member between said flange and said washer, and a gear disposed rotatably on said bushing.

3. In a transmission of the class described, a splined shaft, a groove therein, a retainer sleeve disposed within said groove, and a gear rotatably disposed on said sleeve.

4. In a transmission, a splined shaft, a gear therefor, and means for mounting said gear rotatably thereon but restrained against movement longitudinally thereto, comprising a groove in said splined shaft, and a bearing support disposed removably in said groove.

5. A bearing, comprising a tubular member provided with a laterally extending flange at one end thereof, a bearing bushing thereon, a washer attached to the opposite end of said member and extending laterally therefrom, interlocking means on said member and said washer to secure the same against radial displacement, and means for securing axial assembly of said member and said washer.

6. In a transmission, a splined shaft having a groove, a gear therefor, a bearing attached to said shaft and disposed in said groove for rotatably supporting said gear thereon, said bearing comprising a tubular member provided at one end with a laterally extending flange, a bearing bushing thereon, a washer attached to the other end of said member and extending laterally therefrom, interlocking means on said member and said washer to secure the same against radial displacement, and means disposed in said groove for securing axial assembly of said member and said washer.

7. In a transmission of the class described, a rotatable shaft, a splined section thereon, a groove in said section, a splined member provided with a flange at one end, said member being rotatable on said shaft within said groove to bring the splines thereof in line with the splines on said section at opposite ends of the groove, whereby the axial movement of said member relative to the splined section is limited, a washer fitting said splined section, and cooperating locking means on said member and on said washer for locking said member radially to said washer to restrain the rotation of said member within said groove, whereby said splines are maintained in alignment.

8. In a transmission, a shaft having a groove, a bearing sleeve adapted to be seated in said groove, cooperating interlocking means carried by said shaft and said sleeve to permit the latter to be shifted longitudinally of the shaft and to be inserted in said groove and to be rotated relative to the shaft to interlock the sleeve thereon, a gear member mounted on said sleeve, and means seated in said groove and cooperating with said sleeve to prevent rotation thereof relative to the shaft whereby said sleeve and shaft are held in interlocked relation.

9. In a transmission, a shaft having a splined section, a peripheral groove formed in said shaft, a bearing sleeve adapted to be inserted over said shaft and disposed in said groove, cooperating interlocking means on said shaft and sleeve and operable when said sleeve is in a predetermined angular position with respect to said shaft to maintain said sleeve axially in said groove, a washer having splines adapted to cooperate with the splined section of said shaft and adapted to be seated in said groove at one end of said sleeve, cooperating interlocking means formed on said end of the sleeve and said washer and adapted to prevent relative rotation between said sleeve and said washer, and locking means for the sleeve and washer comprising a ring member adapted to be seated in said groove and to hold said washer against said one end of the sleeve.

10. In a transmission, a shaft having a splined section, a groove formed in said shaft by reducing the height of portions of said splines, a sleeve having shortened interior splines adapted to interengage with the splines of said splined sections and to be axially rotatable when the shortened interior splines are disposed in said groove, and means cooperating with the splines of said splined shaft sections for retaining said sleeve with the shortened interior splines thereof in abutting relation with respect to the splines of said splined shaft sections.

11. In a transmission, a splined shaft, a groove formed in said shaft, a bearing sleeve having a flange at one end and short interior splines adapted to abut against the splines of said shaft when said sleeve is rotated in said groove to a predetermined position, a washer disposed in said groove and provided with splines interengaging with the splines of said shaft, said washer also being provided with interlocking means cooperating with the end of said sleeve opposite the flange thereon to prevent the sleeve from rotating in said groove, a gear member mounted on said sleeve and maintained against axial displacement thereon by said washer and said flange, and a spring ring mounted in said groove and disposed between one end thereof and said washer to retain the latter against the end of the sleeve opposite the flange thereon, whereby said sleeve, washer and gear member are retained in axial assembly.

ROBERT LAPSLEY.